(12) United States Patent
Heinonen et al.

(10) Patent No.: US 8,930,361 B2
(45) Date of Patent: Jan. 6, 2015

(54) METHOD AND APPARATUS FOR CLEANING DATA SETS FOR A SEARCH PROCESS

(75) Inventors: Jarkko Heinonen, Helsinki (FI); Ashish Kumar Agrawal, Gurgaon (IN); Ross Turner, Berlin (DE)

(73) Assignee: Nokia Corporation, Espoo (FI)

( * ) Notice: Subject to any disclaimer, the term of this patent is extended or adjusted under 35 U.S.C. 154(b) by 375 days.

(21) Appl. No.: 13/099,685

(22) Filed: May 3, 2011

(65) Prior Publication Data

US 2012/0254202 A1  Oct. 4, 2012

Related U.S. Application Data

(60) Provisional application No. 61/469,960, filed on Mar. 31, 2011.

(51) Int. Cl.
*G06F 17/30* (2006.01)

(52) U.S. Cl.
CPC .... *G06F 17/30241* (2013.01); *G06F 17/30303* (2013.01)
USPC .............. 707/736; 707/754; 706/46; 706/47; 706/48

(58) Field of Classification Search
None
See application file for complete search history.

(56) References Cited

U.S. PATENT DOCUMENTS

| 7,636,732 | B1 * | 12/2009 | Nielsen | 1/1 |
| 8,375,042 | B1 * | 2/2013 | Wang et al. | 707/759 |
| 2007/0276845 | A1 * | 11/2007 | Geilich | 707/100 |
| 2008/0077573 | A1 * | 3/2008 | Weinberg et al. | 707/5 |
| 2009/0012984 | A1 * | 1/2009 | Ravid et al. | 707/101 |
| 2009/0089657 | A1 * | 4/2009 | Davis | 715/234 |
| 2010/0005048 | A1 * | 1/2010 | Bodapati et al. | 706/47 |
| 2011/0004610 | A1 | 1/2011 | Rose | |
| 2011/0055186 | A1 * | 3/2011 | Gopalakrishnan | 707/706 |
| 2012/0036125 | A1 * | 2/2012 | Al-Kofahi et al. | 707/728 |

OTHER PUBLICATIONS

Jansen, B. et al. "How to Define Searching Sessions on Web Search Engines," WebKDD 2006, Aug. 20, 2006, pp. 1-9 (http://webmining.spd.louisville.edu/webkdd06/papers/paper-6-how-to-define-search-sessions-WM_1064%5B1%5D.pdf).

* cited by examiner

*Primary Examiner* — Angelica Ruiz
(74) *Attorney, Agent, or Firm* — Ditthavong & Steiner, P.C.

(57) ABSTRACT

An approach is provided for cleaning data sets for a search process. The cleanup platform determines one or more reference documents associated with at least one region. Next, the cleanup platform processes and/or facilitates a processing of the one or more reference documents to determine a frequency distribution of one or more candidate stop words with respect to the at least one region. Then, the cleanup platform causes, at least in part, selection of one or more stop words applicable to the at least one region from the one or more candidate stop words based, at least in part, on one or more frequency distribution criteria. Additionally, the cleanup platform processes and/or facilitates a processing of at least one data set associated with a search process to generate at least one enhanced data set by filtering the one or more stop words from the at least one data set.

20 Claims, 11 Drawing Sheets

FIG. 3
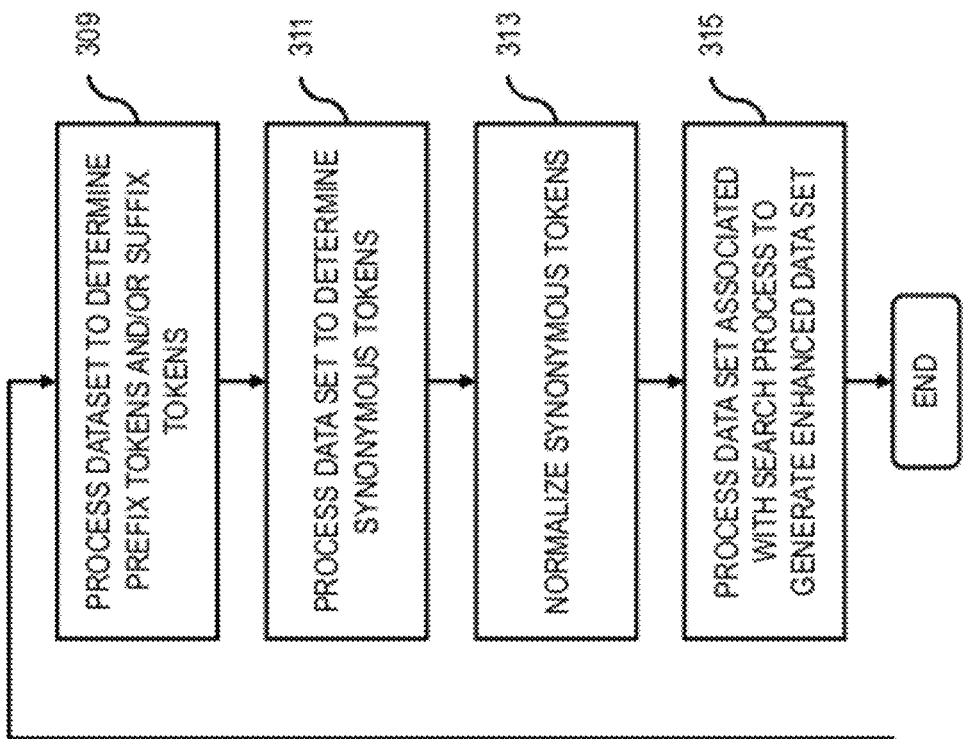
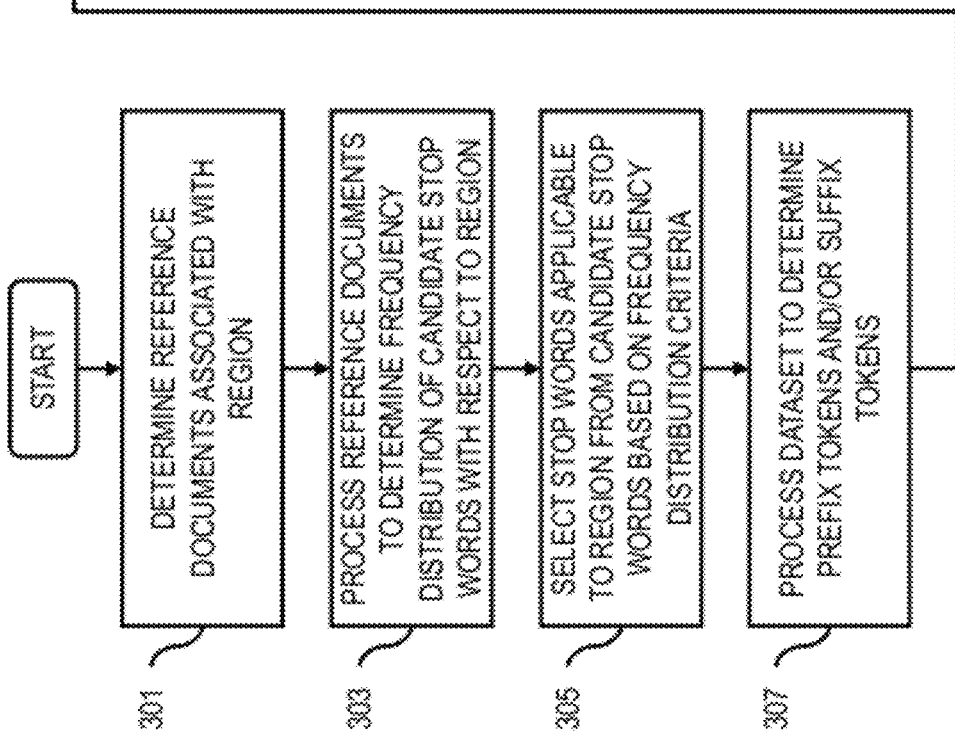

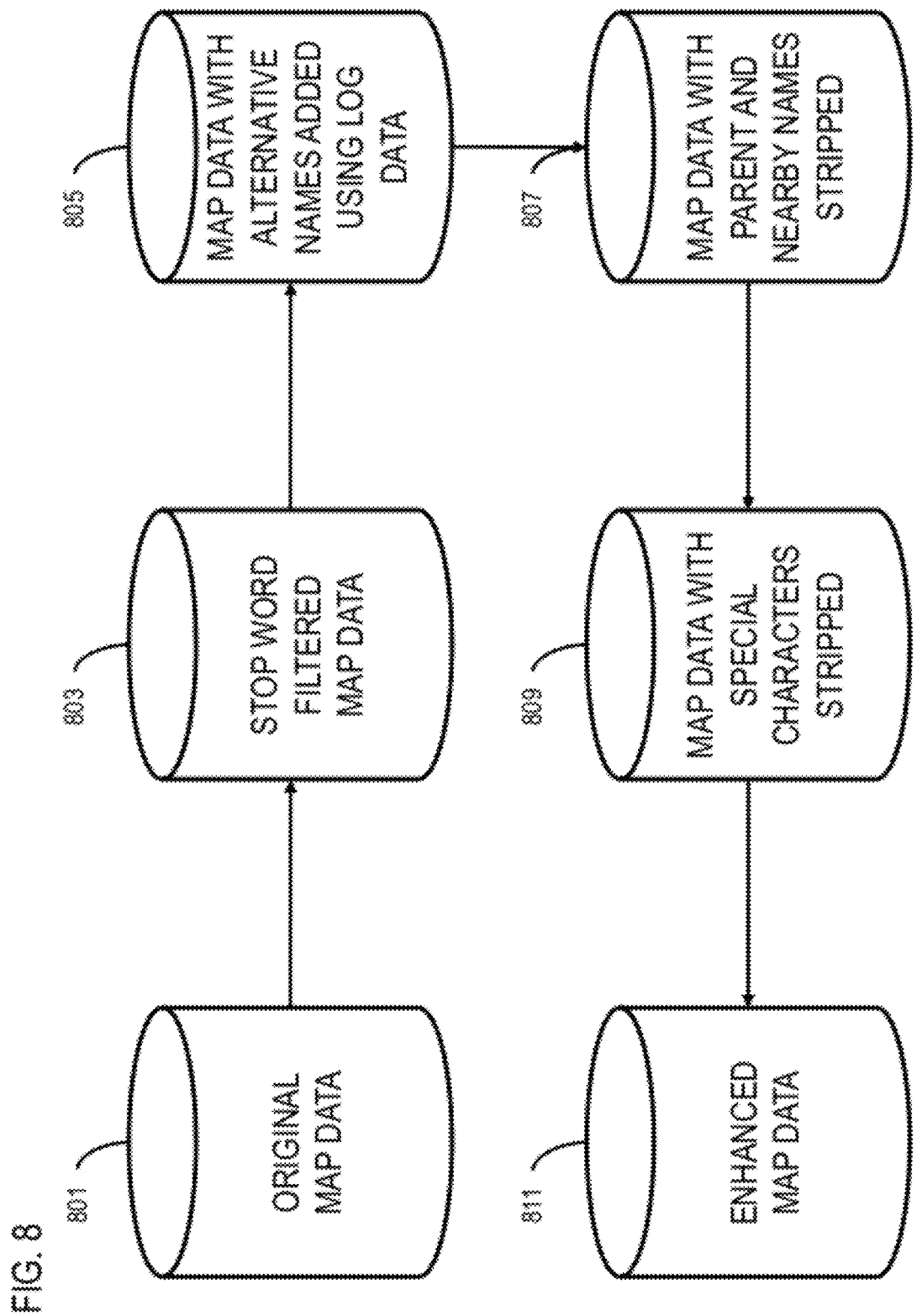

METHOD AND APPARATUS FOR CLEANING DATA SETS FOR A SEARCH PROCESS

RELATED APPLICATIONS

This application claims the benefit of the earlier filing date under 35 U.S.C. §119(e) of U.S. Provisional Application Ser. No. 61/469,960 filed on Mar. 31, 2011, entitled "Method and Apparatus for Cleaning Data Sets for a Search Process," the entirety of which is incorporated herein by reference.

BACKGROUND

Service providers and device manufacturers (e.g., wireless, cellular, etc.) are continually challenged to deliver value and convenience to consumers by, for example, providing compelling network services. One area of interest has been the development of search-related technologies. For example, search engines have recently attained enormous popularity because of their ability to quickly produce relevant results. In the context of web search, search engines generally operate by crawling the web and indexing data as well as recording search-related user activity for future searches. The process of gathering and compiling data for search engines, however, may produce cluttered data sets, which in turn may lead to ineffective or inefficient search results (e.g., longer search times, misplacement of relevant results, etc.). In location-related searches, for instance, these data sets may include duplicate data points, locations with uncommonly known names, etc.

SOME EXAMPLE EMBODIMENTS

Therefore, there is a need for an approach for effectively cleaning data sets for a search process.

According to one embodiment, a method comprises determining one or more reference documents associated with at least one region. The method also comprises processing and/or facilitating a processing of the one or more reference documents to determine a frequency distribution of one or more candidate stop words with respect to the at least one region. The method further comprises causing, at least in part, selection of one or more stop words applicable to the at least one region from the one or more candidate stop words based, at least in part, on one or more frequency distribution criteria. The method additionally comprises processing and/or facilitating a processing of at least one data set associated with a search process to generate at least one enhanced data set by filtering the one or more stop words from the at least one data set.

According to another embodiment, an apparatus comprises at least one processor, and at least one memory including computer program code, the at least one memory and the computer program code configured to, with the at least one processor, cause, at least in part, the apparatus to determine one or more reference documents associated with at least one region. The apparatus is also caused to process and/or facilitate a processing of the one or more reference documents to determine a frequency distribution of one or more candidate stop words with respect to the at least one region. The apparatus is further caused to select one or more stop words applicable to the at least one region from the one or more candidate stop words based, at least in part, on one or more frequency distribution criteria. The apparatus is additionally caused to process and/or facilitate a processing of at least one data set associated with a search process to generate at least one enhanced data set by filtering the one or more stop words from the at least one data set.

According to another embodiment, a computer-readable storage medium carries one or more sequences of one or more instructions which, when executed by one or more processors, cause, at least in part, an apparatus to determine one or more reference documents associated with at least one region. The apparatus is also caused to process and/or facilitate a processing of the one or more reference documents to determine a frequency distribution of one or more candidate stop words with respect to the at least one region. The apparatus is further caused to select one or more stop words applicable to the at least one region from the one or more candidate stop words based, at least in part, on one or more frequency distribution criteria. The apparatus is additionally caused to process and/or facilitate a processing of at least one data set associated with a search process to generate at least one enhanced data set by filtering the one or more stop words from the at least one data set.

According to another embodiment, an apparatus comprises means for determining one or more reference documents associated with at least one region. The apparatus also comprises means for processing and/or facilitating a processing of the one or more reference documents to determine a frequency distribution of one or more candidate stop words with respect to the at least one region. The apparatus further comprises means for causing, at least in part, selection of one or more stop words applicable to the at least one region from the one or more candidate stop words based, at least in part, on one or more frequency distribution criteria. The apparatus additionally comprises means for processing and/or facilitating a processing of at least one data set associated with a search process to generate at least one enhanced data set by filtering the one or more stop words from the at least one data set.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for cleaning data sets for a search process, according to one embodiment;

FIG. 8 is a diagram illustrating data set cleaning utilized in the processes of FIG. 3, according to one embodiment;

DESCRIPTION OF SOME EMBODIMENTS

Examples of a method, apparatus, and computer program for cleaning data sets for a search process are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to location-based search processes, it is contemplated that the approach described herein may be used with other search processes. For example, the approach may be used with a location-based search process, a content search process, a service search process, etc.

Figure 1:
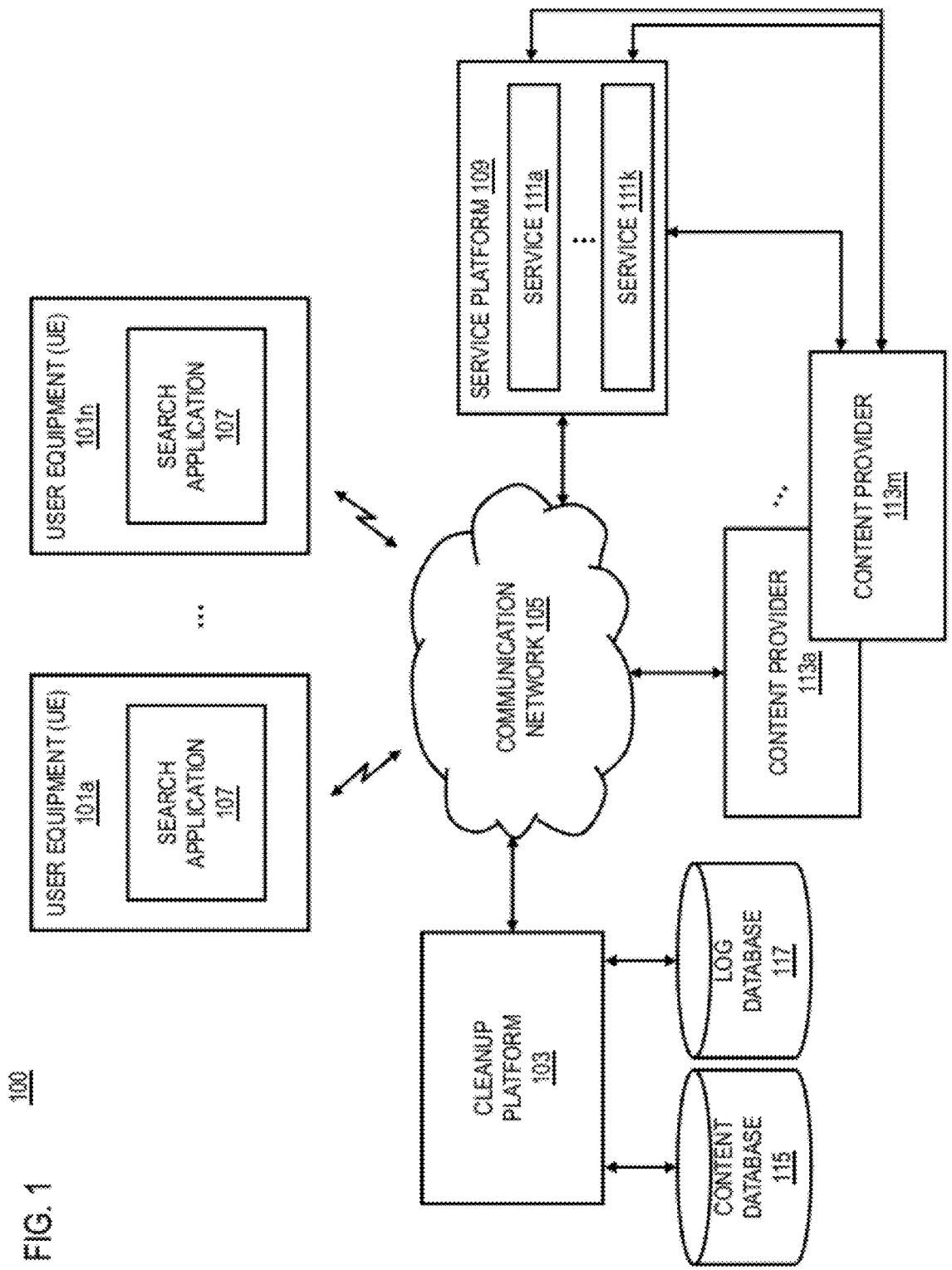
FIG. 1 is a diagram of a system capable of cleaning data sets for a search process, according to one embodiment.

FIG. 1 is a diagram of a system capable of cleaning data sets for a search process, according to one embodiment. As mentioned, recent advances in the field of search have enabled technologies like search engines to produce fast and relevant results, attracting a growing number of users. By way of example, a search engine serves a user request by returning relevant results to satisfy a user's need for information. The relevancy of the information may depend upon various factors, such as geographic location of search, user interest, previous searches by users, distance of results from a search center, importance of search results with respect to other available items, etc. In order to produce these results, information must be gathered and compiled. In the context of web search, for instance, the information may be obtained by directing bots to crawl the Internet and index data, by recording search-related user activity (e.g., metadata about user, search settings, search string, etc.), etc., over some extended period of time. However, such processes may result in cluttered and excessively large data sets. In location-related searches, for instance, these data sets may include duplicate data points, locations with uncommonly known names (e.g., "Frankfurt am main" as opposed to "Frankfurt"), etc. Because search engines rely on these data sets, issues such as longer search times, misplacement of relevant results, etc., may arise.

To address this problem, a system 100 of FIG. 1 introduces the capability to clean and enhance data sets for a search process. Specifically, the system 100 may process a data set associated with the search process to generate an enhanced data set through a filtering and/or normalization process. By way of example, the system 100 may generate the enhanced data set by filtering a select group of stop words applicable to a particular region from the data set. The group of stop words may, for instance, be selected from a group of candidate stop words based on the frequency of the candidate stop words with respect to the particular region in one or more reference documents. Moreover, the data set may be a content data set over which the search process operates, a search log data set for recording user activity related to the search process, an access log data set for recording user access of the content data set, or any other data set related to the search process.

In one scenario, it may be determined that particular stop words, such as "city of", "greater", "north", "south", "east", "west", etc., are applicable to a certain region and should be filtered out of the data set when generating the enhanced data set. As such, city names located in the data set with the particular stop words such as "Lexington, city of" and "greater Buffalo" may appear in the enhanced data set as "Lexington" and "Buffalo" respectively. Thus, in this way, the enhanced data set may contain data that is more pertinent to searches (e.g., users do not commonly include "city of" in a search query for the city). In addition, the size of the enhanced data set may be significantly reduced compared to the data set from which the enhanced data set was generated. In another scenario, it may be determined that "north", "south", "east", "west", etc., are terms that are relevant to user searches in a particular region. In this case, the terms may be excluded from the group of stop words to be filtered out when generating the enhanced data set. For example, certain directional terms may be considered stop words where they appear in the data as entity names at nearby locations that share common affixes (e.g., "North Bangalore" vs. "South Bangalore"). However, they may, for instance, not be considered stop words where no such relationship exists (e.g., East London, South Africa).

In various embodiments, the enhanced data set may be generated based on an association of alternative tokens with respective tokens of the data set. By ways of example, the alternative tokens may be determined by processing metadata associated with users of the search process, wherein the metadata includes search histories, context information, etc. In one scenario, the metadata may demonstrate that many users located near Newcastle upon Tyne, United Kingdom searched for "Newcastle". Under these circumstances, it is more likely that the users are searching for information relating to Newcastle upon Tyne, United Kingdom rather than, for instance, Newcastle, Australia. As a result, the discovery of the particular searches for "Newcastle" may be utilized to determine that Newcastle upon Tyne, United Kingdom should be associated with the search term "Newcastle".

In certain embodiments, the enhanced data set may be generated based on a filtering of prefix and/or suffix tokens determined from a processing of the data set. In one use case, the prefix and/or suffix tokens may be parent or nearby entity tokens. As an example, Charminar is a famous tourist place in Hyderabad, India. In map data, Charminar is frequently listed as "Charminar Hyderabad," which may create problems when determining relevance for the famous tourist attraction using log data because users commonly search for Charminar without the city name. Thus, it may be determined that "Hyderabad" is a suffix token that should be filtered out of "Charminar Hyderabad." As another example, Alexanderplatz is a popular place in Berlin, Germany. In map data, there are many instances where Alexanderplatz is listed along with nearby street names, such as "Alexanderplatz/Gontardstrasse." According, it may be determined that "Gontardstrasse" (or "/Gontardstrasse") is a suffix token that should be filtered out of "Alexanderplatz/Gontardstrasse."

In another use case, the prefix tokens and/or suffix tokens may be some portion at the beginning or at the end of search words. As an example, a user who wishes to search for "pizza" may cause a search log data set to include prefix tokens, such as "p", "pi", "piz", or "pizz", along with the actual search token "pizza". As such, the prefix tokens may be filtered out of specific portions of the search log data set (e.g., associated with the user, associated with a time period, etc.) containing the prefix tokens and the actual search token.

In certain other embodiments, the enhanced data set may be generated based on a normalization of synonymous tokens determined from a processing of the data set. By way of example, synonymous tokens may be determined by ignoring particular special characters as the data set is processed (e.g., hyphen (-), space ( ) separator (/), etc.). In one scenario, for instance, "Karl-Liebknecht-Strasse" may be determined to be synonymous with "Karl Liebknecht Strasse", "Alexanderplatz/Gontardstrasse" may be determined to be synonymous with "Alexanderplatz-Gontardstrasse", etc. Here, the normalization process may include removal of the particular special characters from within the synonymous tokens. Accordingly, "Karl-Liebknecht-Strasse" and "Karl Liebknecht Strasse" may be normalized to "KarlLiebknechtStrasse", "Alexanderplatz/Gontardstrasse" and "Alexanderplatz-Gontardstrasse" may be normalized to "AlexanderplatzGontardstrasse", etc, in the enhanced data set.

By way of another example, the normalization process may comprise removal of duplicates discovered among the synonymous tokens based on context information associated with the synonymous tokens. In the context of place data, for instance, there are various sources for collecting information, such as data providers, yellow pages, web crawling bots, etc., which may introduce a significant number of duplicates. In one use case, the tokens "Charminar Hyderabad" and "Charminar" may be detected as synonymous tokens. While processing the tokens, it may, for instance, be determined that the geographical locations (e.g., via latitude/longitude coordinates) associated with the tokens are in very close proximity with each other (if not the same as each other). Accordingly, at least one of the tokens "Charminar Hyderabad" and "Charminar" may be marked as a duplicate. As such, the normalization process may remove the duplicate (or duplicates) when generating the enhanced dataset.

By way of a further example, the normalization process may be based on translations and/or permutations of the synonymous tokens determined through the processing of the data set. In one scenario, the processing of the data set may reveal the tokens "Berlin Flughafen" and "Airport Berlin". In this case, a translation to English and a permutation of the tokens may demonstrate that both of the tokens are associated with the name "Berlin Airport". Similarly, a translation to German may also demonstrate that both of the tokens are associated with the name "Berlin Flughafen". As such, the tokens may, for instance, be normalized to "Berlin Airport" or "Berlin Flughafen". Accordingly, at least one of the tokens may also be marked as a duplicate. Thus, the normalization process may also remove the duplicate (or duplicates) when generating the enhanced data set.

More specifically, the system 100 may determine one or more reference documents associated with at least one region. The system 100 may then process and/or facilitate a processing of the one or more reference documents to determine a frequency distribution of one or more candidate stop words with respect to the at least one region. The system 100 may further cause, at least in part, selection of one or more stop words applicable to the at least one region from the one or more candidate stop words based, at least in part, on one or more frequency distribution criteria. As provided, the one or more stop words applicable to the at least one region may, for instance, include "city of", "greater", "north", "south", "east", "west", etc. The system 100 may additionally process and/or facilitate a processing of at least one data set associated with a search process to generate at least one enhanced data set by filtering the one or more stop words from the at least one data set. As mentioned, the at least one data set may include at least one content data set over which the search process operates, at least one search log data set for recording activity associated with one or more users of the search process, at least one access log data set for recording access by the one or more users to the at least one content data set, or any other search-related data sets. Moreover, the search process may include a location-based search process, a content search process, a service search process, or any other search process.

As shown in FIG. 1, the system 100 comprises a user equipment (UE) 101 or multiple UEs 101 (or UEs 101a-101n) having connectivity to a cleanup platform 103 via a communication network 105. The UE 101 may include and have access to a search application 107 to enable the UE 101 to perform a location-based search, a content search, a service search, etc., through, for instance, the service platform 109.

The service platform 109 may include or have access to services 111 (or services 111a-111k), which may serve content provided by content providers 113 (or content providers 113a-113m). Moreover, the service platform 109 may provide, via the services 111, the content providers 113, etc., content or log data that may be stored at a content database 115, a log database 117, etc. In addition, the UE 101 may, for instance, cause the log database 117 to populate (e.g., recording of user activity as log data) by performing searches or by accessing content through the service platform 109. In turn, the cleanup platform 103 may include or have access to the content database 115 and the log database 117 to generate enhanced data sets by processing data located within the content database 115 and the log database 117.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In another embodiment, the cleanup platform 103 may determine metadata associated with one or more users of the search process, wherein the metadata includes one or more search histories, context information, etc. The cleanup platform 103 may then process and/or facilitate a processing of the metadata to determine one or more alternative tokens to associated with one or more tokens of the at least one data set, wherein the at least one enhanced data set is further based on the association of the one or more alternative tokens with the one or more tokens. For example, previous search queries that are at least a partial match of a nearby city with respect to the location from which the queries were performed (e.g., searches of "Newcastle" performed near Newcastle upon Tyne, United Kingdom) may indicate that the users intended to search for the nearby city. Thus, it may be appropriate to associate the partial match (e.g., "Newcastle") with the nearby city (e.g., Newcastle upon Tyne, United Kingdom), for instance, where there is a high frequency of such search queries.

In another embodiment, the cleanup platform 103 may process and/or facilitate a processing of the at least one data set to determine one or more prefix tokens, one or more suffix tokens, etc., wherein the at least one enhanced data set is further based on filtering of the one or more prefix tokens, the one or more suffix tokens, etc., from the at least one data set. As mentioned, the one or more prefix tokens and/or the one or more suffix tokens may be parent or nearby entity tokens (e.g., "Hyderabad" of "Charminar Hyderabad", "/Gontardstrasse" of "Alexanderplatz/Gontardstrasse", etc.). Also, the one or more prefix tokens and/or the one or more suffix tokens may be some portion at the beginning or at the end of search words typed, for instance, by a user. In one scenario, where each keystroke is logged, words captured from a search for "pizzas" may include "p", "pi", "piz", "pizz", "pizza", "pizzas", etc. As such, the one or more prefix tokens may, for instance, be "p", "pi", "piz", or "pizz", and the one or more suffix tokens may be "s".

In another embodiment, the cleanup platform 103 may process and/or facilitate a processing of at least one data set to determine one or more synonymous tokens. The cleanup platform 103 may then normalize the one or more synonymous tokens, wherein the at least one enhanced data set is further based on the normalization. As discussed, the determination and the normalization of the one or more synonymous tokens may, for instance, include removal of one or more special characters (e.g., hyphen (-), space ( ) separator (/), etc.) from the one or more synonymous tokens. Moreover, in a further embodiment, the determination and the normalization of the one or more synonymous tokens may include removal of one or more category names (e.g., "Generic Burger Fast Food" to "Generic Burger") and/or abbreviation of one or more terms (e.g., "Street" to "Str.", "St." to "Str.", etc.).

In another embodiment, the cleanup platform 103 may determine respective context information associated with the one or more synonymous tokens. The cleanup platform 103 may then process and/or facilitate a processing of the respective context information to determine one or more duplicates among the one or more synonymous tokens, wherein the normalization comprises removal of the one or more duplicates. As provided, the context information may indicate that the geographical locations associated with the one or more synonymous tokens (e.g., "Charminar Hyderabad" and "Charminar") are in very close proximity with each other. In such a case, the particular tokens may, for instance, be marked for removal as duplicates.

In another embodiment, the cleanup platform 103 may process and/or facilitate a processing of the at least one data set to determine one or more translations, one or more permutations, etc., of the one or more synonymous tokens, wherein the normalization is based on the one or more translation, the one or more permutations, etc. As explained, the one or more translations and/or the one or more permutations of the one or more synonymous tokens (e.g., "Berlin Flughafen", "Airport Berlin", etc.) may also indicate duplicates among the one or more synonymous tokens. As such, the normalization of the one or more synonymous tokens may also include removal of one or more of these duplicates.

In another embodiment, the cleanup platform 103 may process and/or facilitate a processing of the at least one data set to determine context information, one or more users, etc., associated with one or more tokens of the at least one data set. The cleanup platform 103 may then determine a frequency distribution based, at least in part, on the context information, the one or more users, etc., wherein the at least one enhanced data set is further based on filtering of the one or more tokens according to the frequency distribution. By way of example, locations, times, and/or users associated with the one or more tokens may be determined while processing the at least one data set. In one scenario, a frequency distribution based on the locations, times, and/or users associated with the one or more tokens may demonstrate, for instance, that a large (or perhaps disproportionate) number of previous search queries associated with at least one of the one or more tokens had emanated from a particular isolated area and time period. Such occurrences may, for instance, indicate that the previous search queries are associated with testing or noisy data. Thus, it may be beneficial to filter tokens associated with those previous search queries when generating the at least one enhanced data set. In another scenario, the frequency distribution may demonstrate that an abnormal number of previous search queries associated with at least one of the one or more tokens were performed by the same user or by the same group of users (e.g., searches associated with the same universally unique identifier (UUID)) during an isolated time period. As such, these circumstances may also indicate that the particular previous search queries are associated with testing or noisy data. Again, it may be beneficial to filter tokens associated with those previous search queries when generating the at least one enhanced data set.

In another embodiment, the cleanup platform 103 may process and/or facilitate a processing of the at least one data set to determine one or more string tokens associated with at least one test model, wherein the at least one enhanced data set is further based, at least in part, on filtering of the one or more string tokens. By way of example, it may be known that a particular test model is used frequently for regression testing purposes. The particular test model thus may, for instance, include a number of test cases (e.g., test cases containing the one or more string tokens) used for automated testing for mapping and/or navigation services. As such, it may be beneficial to determine and filter the one or more string tokens associated with such testing procedures when generating the at least one enhanced data set.

By way of example, the UE 101, the cleanup platform 103, the service platform 109, and the content providers 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
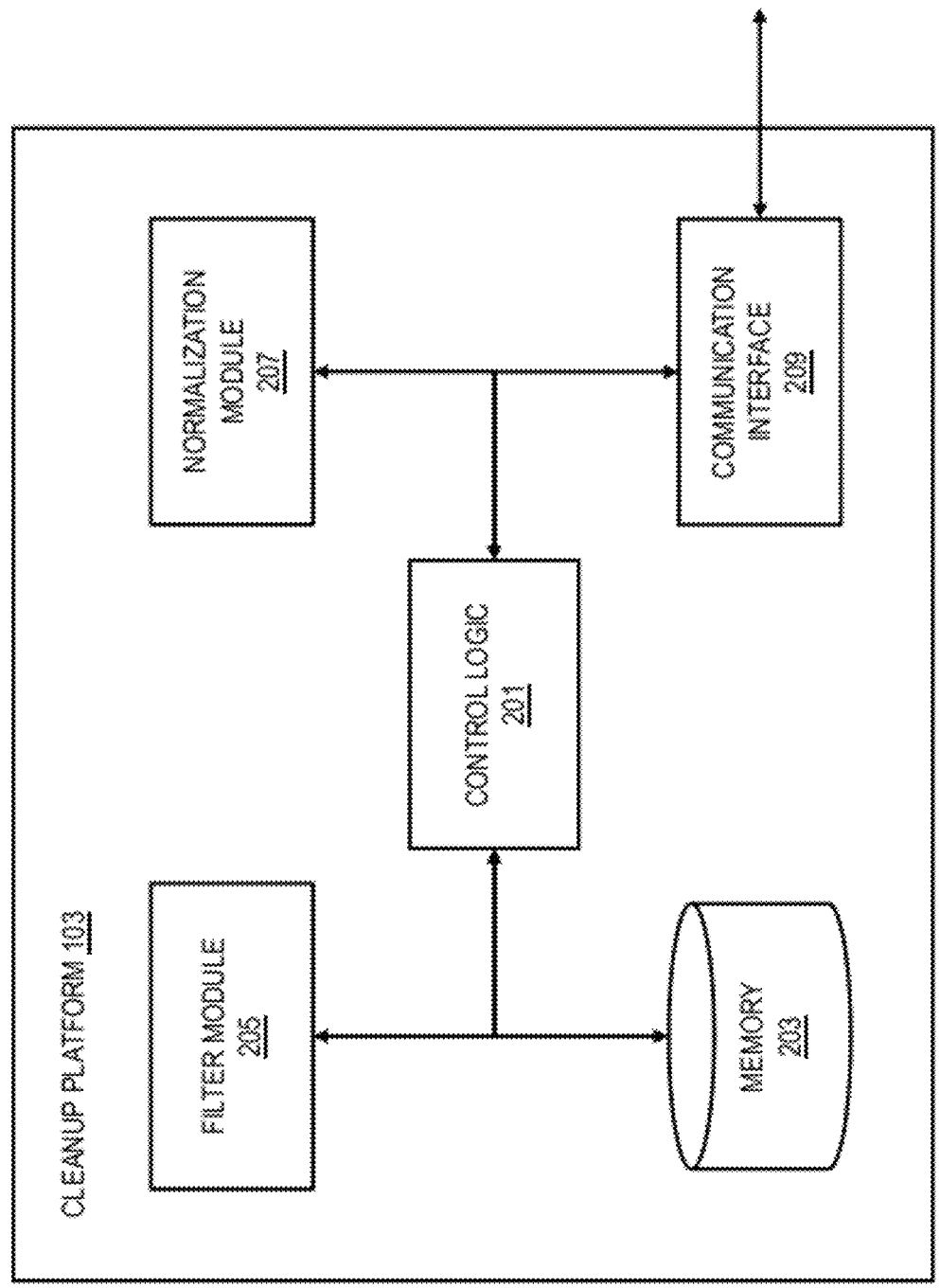
FIG. 2 is a diagram of the components of a cleanup platform, according to one embodiment.

FIG. 2 is a diagram of the components of a cleanup platform, according to one embodiment. By way of example, the cleanup platform 103 includes one or more components for providing cleaning data sets for a search process. It is contemplated that the functions of these components may be combined in one or more components or performed by other components of equivalent functionality. In this embodiment, the cleanup platform 103 includes control logic 201, memory 203, a filter module 205, a normalization module 207, and a communication interface 209.

The control logic 201 executes at least one algorithm for executing functions of the cleanup platform 103. For example, the control logic 201 may interact with the filter module 205 to determine stop words applicable to a particular region using references documents associated with the particular region. Moreover, the filter module 205 may also engage in the processing of a data set to determine prefix tokens and suffix tokens. As such, the filter module 205 may then generate an enhanced data set by filtering the stop words, the prefix tokens, and/or the suffix tokens from a data set associated with a search process.

Next, the control logic 201 may direct the normalization module 207 to process the data set for synonymous tokens. After determining the synonymous tokens, the normalization module 207 may, for instance, determine respective context information associated with the synonymous tokens and process the respective context information to determine duplicates among the synonymous tokens. At the same time, the normalization module 207 may further process the data set to determine translations and/or permutations of the synonymous tokens, which may also be utilized in determining duplicates among the synonymous tokens. Accordingly, the normalization module 207 may normalize the synonymous tokens, wherein the normalization process may, for instance, include removal of the duplicates.

The control logic 201 may also utilize the communication interface 209 to communicate with other components of the cleanup platform 103, the UEs 101, the service platform 109, the content providers 113, and other components of the system 100. The communication interface 209 may include multiple means of communication. For example, the communication interface 209 may be able to communicate over SMS, internet protocol, instant messaging, voice sessions (e.g., via a phone network), or other types of communication.

Figure 10:
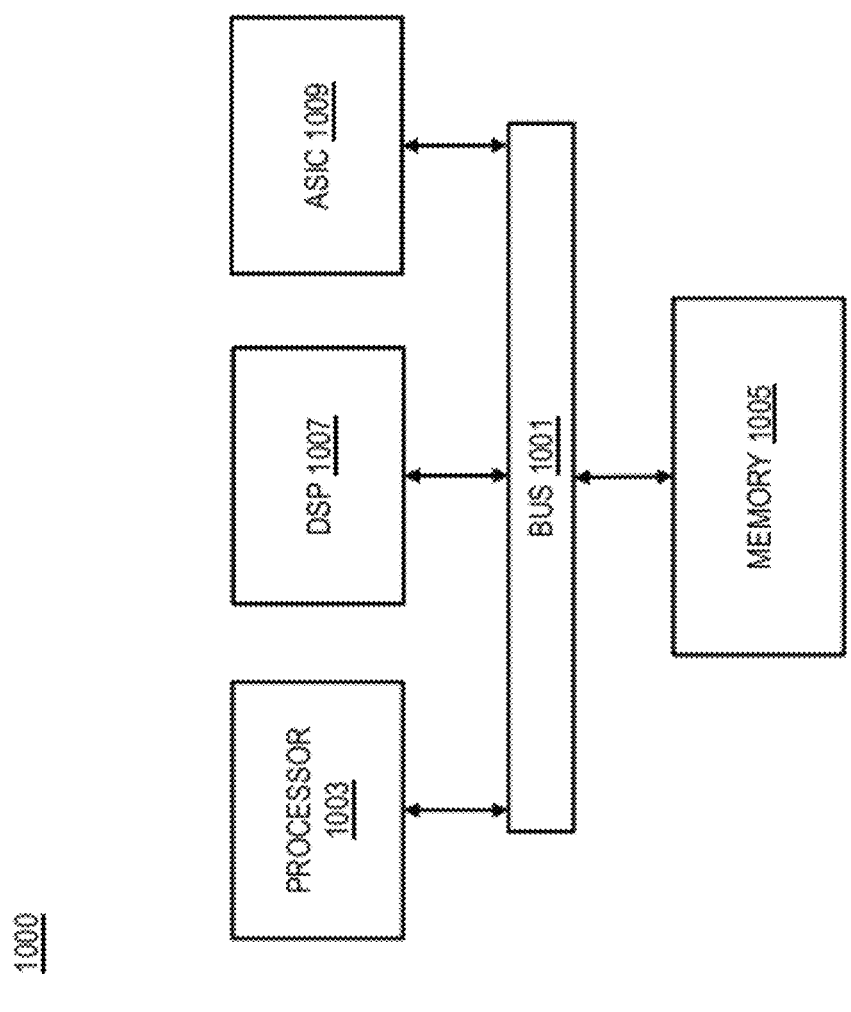
FIG. 10 is a diagram of a chip set that can be used to implement an embodiment of the invention.

FIG. 3 is a flowchart of a process for cleaning data sets for a search process, according to one embodiment. In one embodiment, the control logic 201 and/or other components of the cleanup platform 103 performs the process 300 and is implemented in, for instance, a chip set including a processor and a memory as shown in FIG. 10. As such, the control logic 201 can provide means for accomplishing various parts of the process 300 as well as means for accomplishing other processes in conjunction with other components of the cleanup platform 103.

In step 301, the control logic 201 may determine one or more reference documents associated with at least one region (e.g., a city, a region of a country, a country, an area associated with a particular language, etc.). The control logic 201 may, as in step 303, then process and/or facilitate a processing of the one or more reference documents to determine a frequency distribution of one or more candidate stop words with respect to the at least one region. The control logic 201 may, as in step 305, further cause selection of one or more stop words applicable to the at least one region from the one or more candidate stop words based on one or more frequency distribution criteria. The one or more frequency distribution criteria may, for instance, include a predetermined threshold value, a selection based on the highest document frequencies, etc. As mentioned, examples of stop words applicable to a particular region may include "city of", "greater", "north", "south", "east", "west", etc.

In step 307, the control logic 201 may process and/or facilitate a processing of metadata associated with one or more users of the search process to determine one or more alternative tokens to associate with one or more tokens of the at least one enhanced data set, wherein the enhanced data set is further based on the association of the one or more alternative tokens with the one or more tokens. The metadata may, for instance, include search histories, context information, etc. As discussed, previous search queries that are at least a partial match of a nearby city with respect to the location from which the queries were performed (e.g., searches of "Newcastle" performed near Newcastle upon Tyne, United Kingdom) may indicate that the users intended to search for the nearby city. Accordingly, it may be appropriate to associate the partial match (e.g., "Newcastle") with the nearby city (e.g., Newcastle upon Tyne, United Kingdom), for instance, where there is a high frequency of such search queries.

In step 309, the control logic 201 may process and/or facilitate a processing of the at least one data set to determine one or more prefix tokens, one or more suffix tokens, or a combination thereof. As mentioned, the one or more prefix tokens and/or the one or more suffix tokens may be parent or nearby entity tokens (e.g., "Hyderabad" of "Charminar Hyderabad", "/Gontardstrasse" of "Alexanderplatz/Gontardstrasse", etc.). Also, the one or more prefix tokens and/or the one or more suffix tokens may be some portion at the beginning or at the end of search words typed, for instance, by a user (e.g., "p", "pi", "piz", or "pizz", "s", etc., of the search term "pizzas").

In step 311, the control logic 201 may process and/or facilitate a processing of at least one data set to determine one or more synonymous tokens. The control logic 201 may, as in step 311, then cause a normalization of the one or more synonymous tokens. As discussed, the determination and the normalization of the one or more synonymous tokens may, for instance, include removal of one or more special characters (e.g., hyphen (-), space ( ) separator (/), etc.) from the one or more synonymous tokens. Moreover, the determination and the normalization of the one or more synonymous tokens may also include removal of one or more category names (e.g., "Generic Burger Fast Food" to "Generic Burger") and/or abbreviation of one or more terms (e.g., "Street" to "Str.", "St." to "Str.", etc.).

As previously mentioned, the normalization, in step 313, may also comprise removal of one or more duplicates among the one or more synonymous tokens, wherein the one or more duplicates are determined by processing and/or facilitating a processing of respective context information associated with the one or more synonymous tokens. In one scenario, for instance, the context information may indicate that the geographical locations associated with the one or more synonymous tokens (e.g., "Charminar Hyderabad" and "Charminar") are in very close proximity with each other. In such a case, the particular tokens may be marked for removal as duplicates during the normalization of the one or more synonymous tokens.

Additionally, the normalization, in step 313, may also be based on one or more translations, one or more permutations, or a combination thereof of the one or more synonymous tokens, wherein the one or more translations, the one or more permutations, or a combination thereof is determined by processing and/or facilitating a processing of the at least one data set. As explained, the one or more translations and/or the one or more permutations of the one or more synonymous tokens (e.g., "Berlin Flughafen", "Airport Berlin", etc.) may also indicate duplicates among the one or more synonymous tokens. As such, the normalization of the one or more synonymous tokens may also include removal of one or more of these duplicates.

In step 315, the control logic 201 may process and/or facilitate a processing of at least one data set associated with a search process to generate at least one enhanced data set, wherein the least one enhanced data set is based on (a) a filtering of the one or more stop words from the at least one data set, (b) a filtering of the one or more prefix tokens, the one or more suffix tokens, or a combination thereof from the at least one data set, (c) a normalization of the one or more synonymous tokens, or (d) a combination thereof. As mentioned, the at least one data set may include at least one content data set over which the search process operates, at least one search log data set for recording activity associated with one or more users of the search process, at least one access log data set for recording access by the one or more users to the at least one content data set, or any other search-related data sets. Moreover, the search process may include a location-based search process, a content search process, a service search process, or any other search process.

Figure 4B:
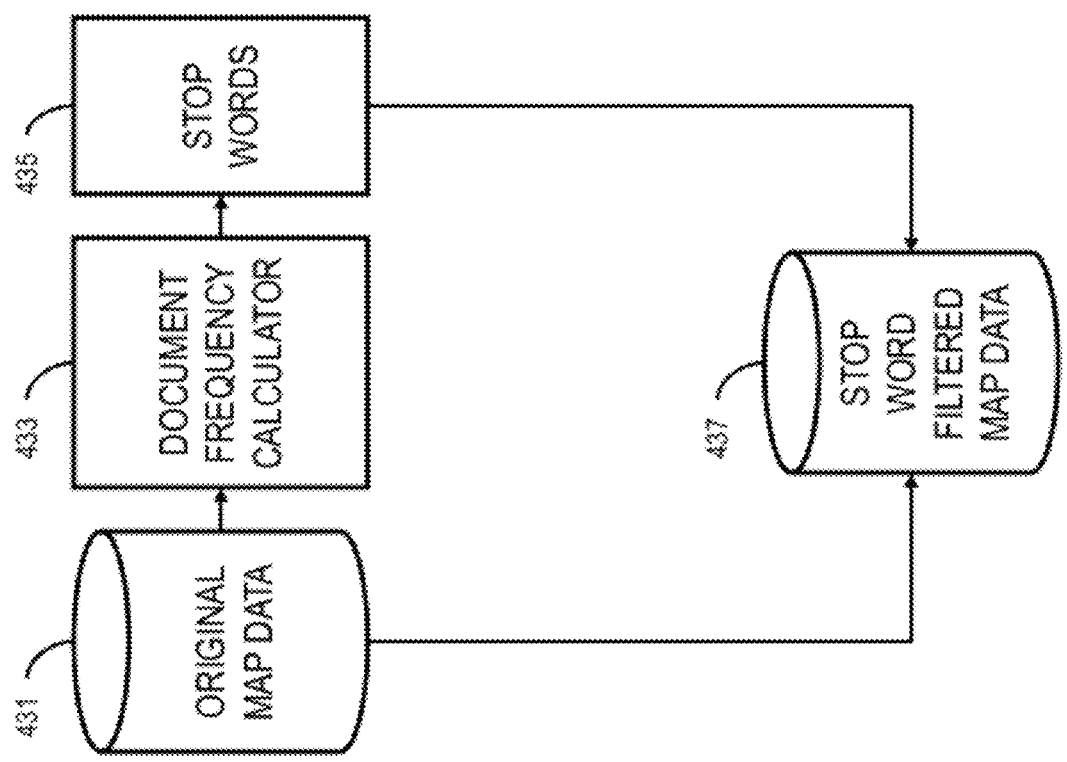
FIGS. 4A and 4B are diagrams illustrating stop word filtering utilized in the processes of FIG. 3, according to various embodiments.
Figure 4A:
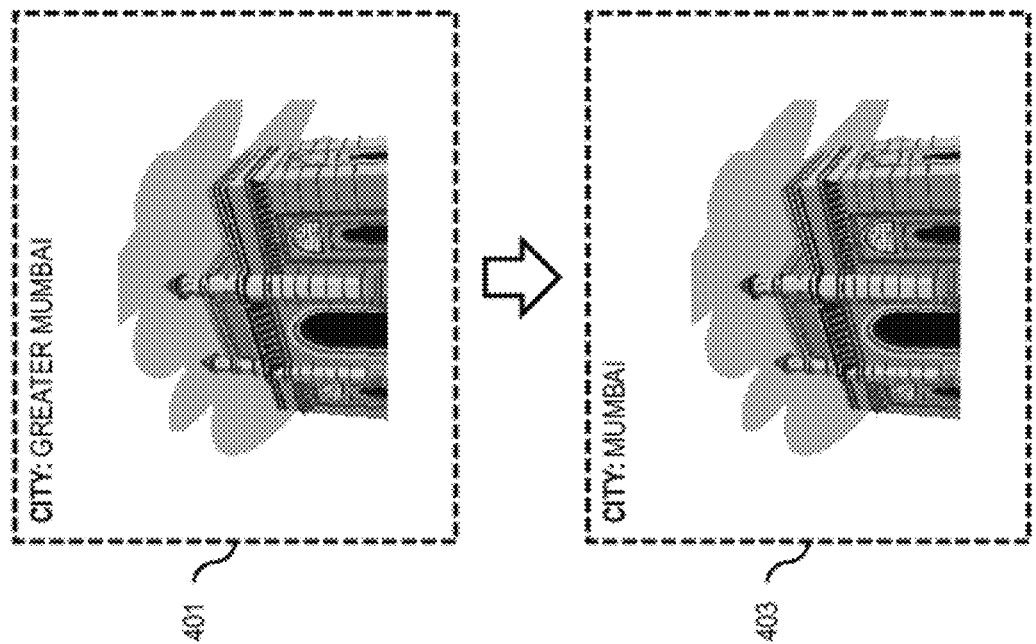

FIGS. 4A and 4B are diagrams illustrating stop word filtering utilized in the processes of FIG. 3, according to various embodiments. FIG. 4A depicts blocks 401 and 403. As shown, the block 401 includes original map data (e.g., "Greater Mumbai", image, etc.) for a city in India. When generating the enhanced data set, one of the selected stop words, "Greater", is filtered out. According, the result is shown in the block 403 with the stop word filtered map data (e.g., "Mumbai", image, etc.) for the city in India. FIG. 4B depicts components running in the background, such as components 431, 433, 435, and 437 (e.g., original map data, document frequency calculator, stop words, and stop word filtered map data). In this example, the reference documents utilized by the document frequency calculator to select the stop words are provided by the original map data. Thereafter, the original map data is processed to filter out the stop words when generating the stop word filtered map data.

Figure 5:
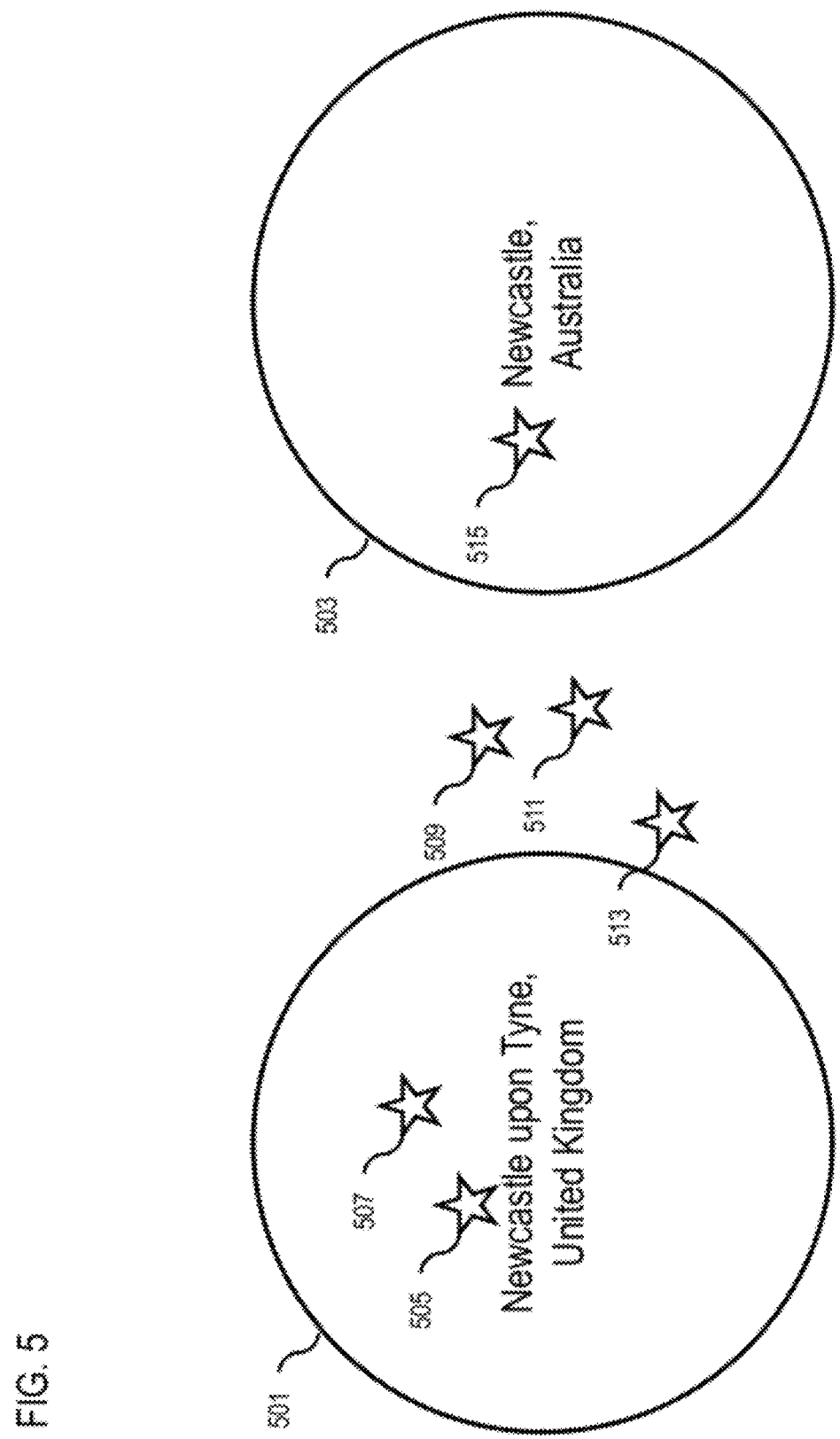
FIG. 5 is a diagram illustrating alternative name association utilized in the processes of FIG. 3, according to one embodiment.

FIG. 5 is a diagram illustrating alternative name association utilized in the processes of FIG. 3, according to one embodiment. FIG. 5 depicts regions 501 and 503, and stars 505, 507, 509, 511, 513, and 515 (or stars 505-515). As shown, the region 501 includes the city, Newcastle upon Tyne, United Kingdom, and the region 503 includes the city, Newcastle, Australia. In this example, the stars 505-515 represent locations from which searches for "Newcastle" were performed. As previously mentioned, search queries that are at least a partial match of a nearby city with respect to the location from which the queries were performed (e.g., searches of "Newcastle" performed near Newcastle upon Tyne, United Kingdom) may indicate that the users intended to search for the nearby city. Thus, it may be appropriate to associate the partial match (e.g., "Newcastle") with the nearby city (e.g., Newcastle upon Tyne, United Kingdom), for instance, where there is a high frequency of such search queries. Here, the regions 501 and 503 may be used to define whether a search for "Newcastle" was performed near the cities within regions 501 and 503. As an example, "Newcastle" may, for instance, be associated with Newcastle upon Tyne, United Kingdom if the stars within the region 501 (e.g., the stars 505 and 507) represented a high frequency of previous searches.

On the other hand, even where it may be difficult to determine one particular city (e.g., Newcastle upon Tyne, United Kingdom vs. Newcastle, Australia) that a user intended to search for, it may still be appropriate to assign an alternative name to all cities that the user likely intended to search, for instance, based on the context information. Here, the stars 509, 511, and 513 are located outside of both regions 501 and 503. As a result, the searches for "Newcastle" associated with the stars 509, 511, and 513 are not defined as being performed near either Newcastle upon Tyne, United Kingdom or Newcastle, Australia. Accordingly, "Newcastle" may still be assigned as an alternative name to both Newcastle upon Tyne, United Kingdom and Newcastle, Australia, for instance, depending on the distance of the stars 509, 511, and 513 from the respective regions and whether those stars represented a high frequency of previous searches.

Figure 6B:
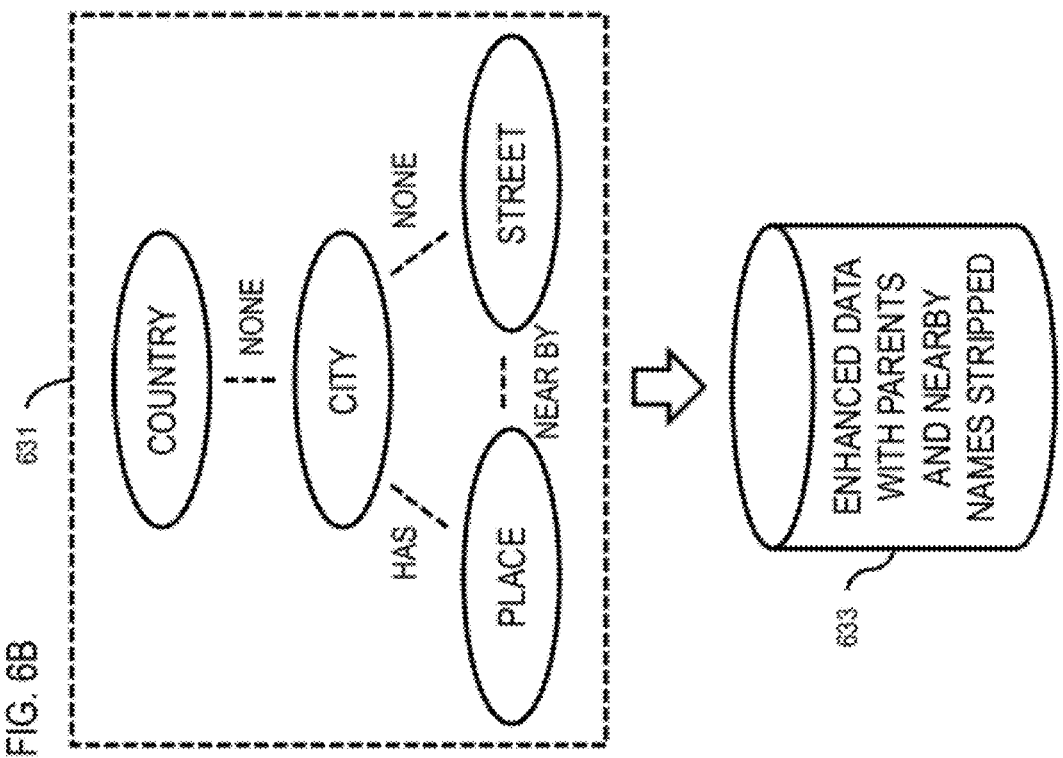
FIGS. 6A and 6B are diagrams illustrating prefix and/or suffix filtering utilized in the processes of FIG. 3, according to various embodiments.
Figure 6A:
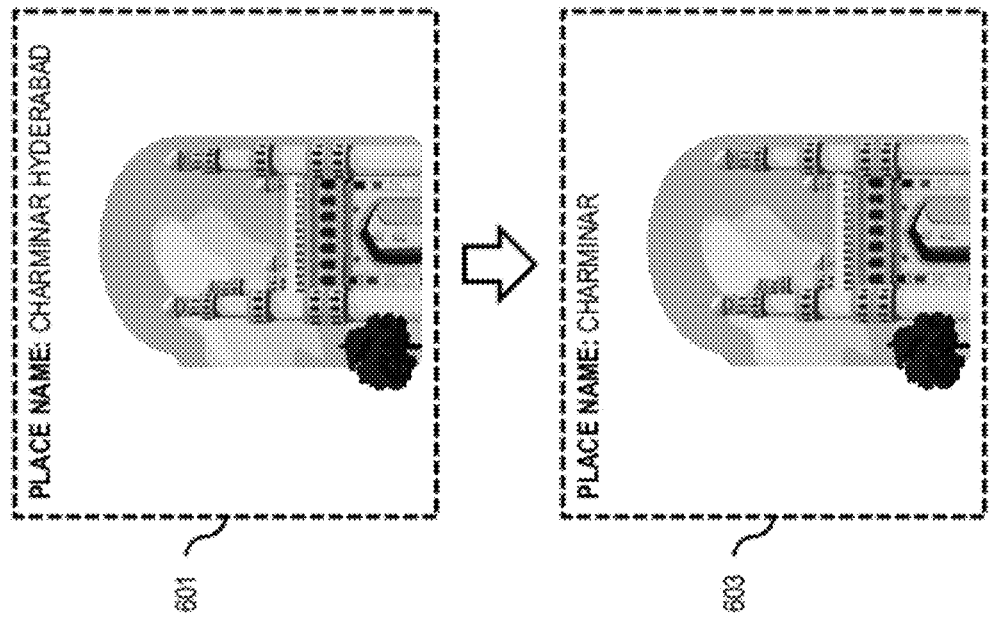

FIGS. 6A and 6B are diagrams illustrating prefix and/or suffix filtering utilized in the processes of FIG. 3, according to various embodiments. FIG. 6A depicts blocks 601 and 603. As shown, the block 601 includes original map data (e.g., "Charminar Hyderabad", image, etc.) for a place in Hyderabad, India. When generating the enhanced data set, the determined suffix (e.g., "Hyderabad") for the place is filtered out. Accordingly, the result is shown in the block 603 (e.g., "Charminar"). FIG. 6B depicts components running in the background, such as components 631 and 633 (e.g., a graph and enhanced data with parents and nearby names stripped). In this example, the graph indicated that the place name included a place token and a city token. After determining that the city token was a suffix token, the original map data is processed to filter out the city token from the place name when generating the enhanced data with parents and nearby names stripped.

Figure 7B:
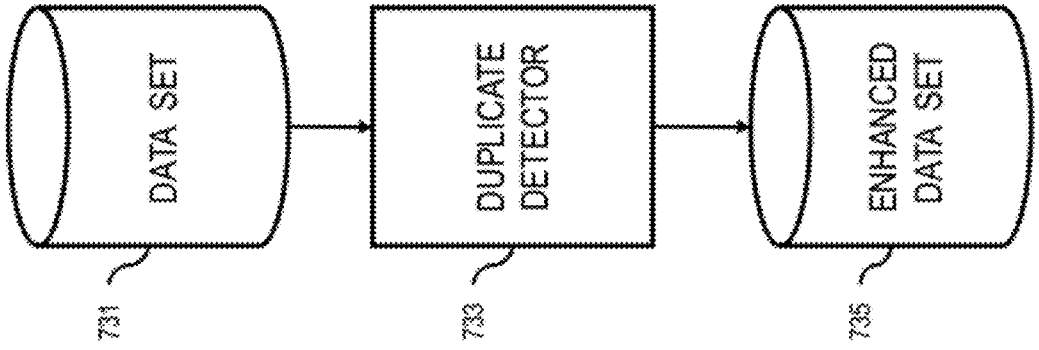
FIGS. 7A and 7B are diagrams illustrating duplicate place detection utilized in the processes of FIG. 3, according to various embodiments.
Figure 7A:
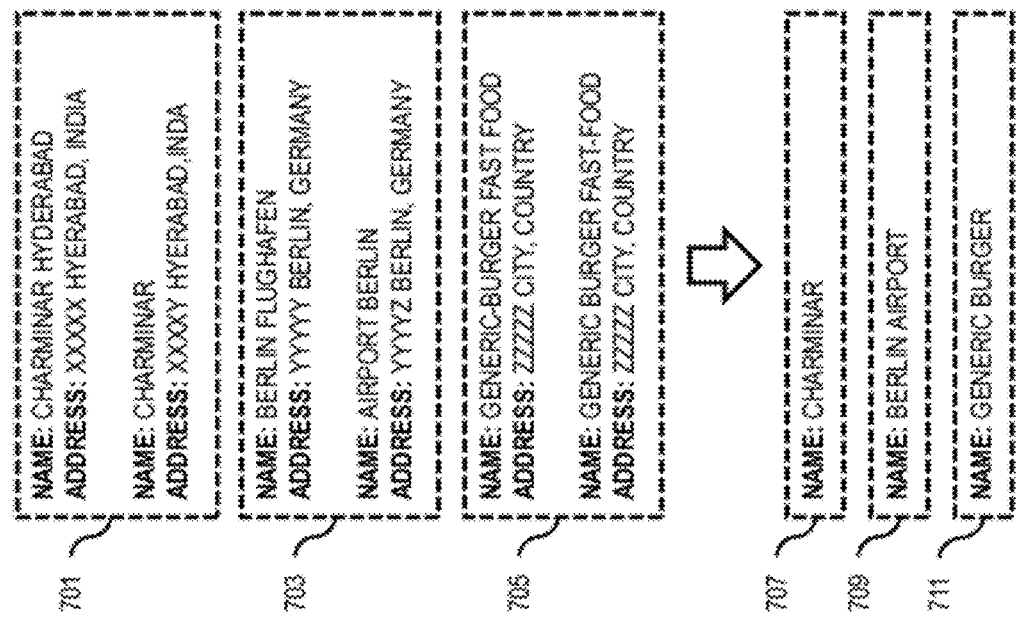

FIGS. 7A and 7B are diagrams illustrating duplicate place detection utilized in the processes of FIG. 3, according to various embodiments. FIG. 7A depicts blocks 701, 703, 705, 707, 709, and 711. As shown, the blocks 701, 703, and 705 includes original map data with synonymous tokens associated with places. When generating the enhanced data set, the synonymous tokens are normalized. In one case, the context information of the synonymous tokens in the block 701 (e.g., "Charminar Hyderabad" and "Charminar") indicates that at least one of the synonymous tokens in the block 701 is a duplicate. In second case, the context information of the synonymous tokens in the block 703 (e.g., "Berlin Flughafen" and "Airport Berlin") as well as the translation and permutation of the synonymous tokens indicate that at least one of the synonymous tokens in the block 703 is a duplicate. In third case, the context information of the synonymous tokens in the block 705 (e.g., "Generic-Burger Fast Food" and "Generic Burger Fast-Food") as well as the removal of the category name (e.g., fast food) and the special character (e.g., hyphen (-)) indicate that the at least one of the synonymous tokens in the block 705 is a duplicate. Thus, as shown in the blocks 707, 709, and 711, the normalization process removes the duplicates when generating the enhanced data set.

FIG. 7B depicts components running in the background, such as components 731, 733, and 735 (e.g., a data set, a duplicate detector, and an enhanced data set). In this example, place data from the data set is passed through the duplicate detector. The duplicate detector then performs the normalization process, which includes the removal of detected duplicates, to generate the enhanced data set.

FIG. 8 is a diagram illustrating data set cleaning utilized in the processes of FIG. 3, according to one embodiment. FIG. 8 depicts map data sets 801, 803, 805, 807, 809, and 811. As shown, the map data set 801 includes original map data. The original map data is passed through a stop word filter, which results in the map data set 803. The map data associated with the map data set 803 is then supplemented with alternative names based on a log data set, which results in the map data set 805. By way of example, an alternative name may be added for a particular token associated with places, streets, cities, countries, etc., where the log data set indicates that users frequently associate the alternative name with the particular token (e.g., "Charminar" vs. "Charminar Hyderabad", "Philly" vs. "Philadelphia", etc.). The determination to add an alternative name for a particular token may, for instance, be based on search histories and/or context information associated with users. The map data associated with the map data set 805 is thereafter stripped of parent and nearby names (e.g., prefix and/or suffix tokens), which results in the map data set 807. The map data associated with the map data set 807 is further stripped of certain special characters, which results in the map data set 809. The map data associated with the map data set 809 is subsequently processed with other enhancements, which results in the map data set 811 (e.g., an enhanced map data set).

The processes described herein for cleaning data sets for a search process may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
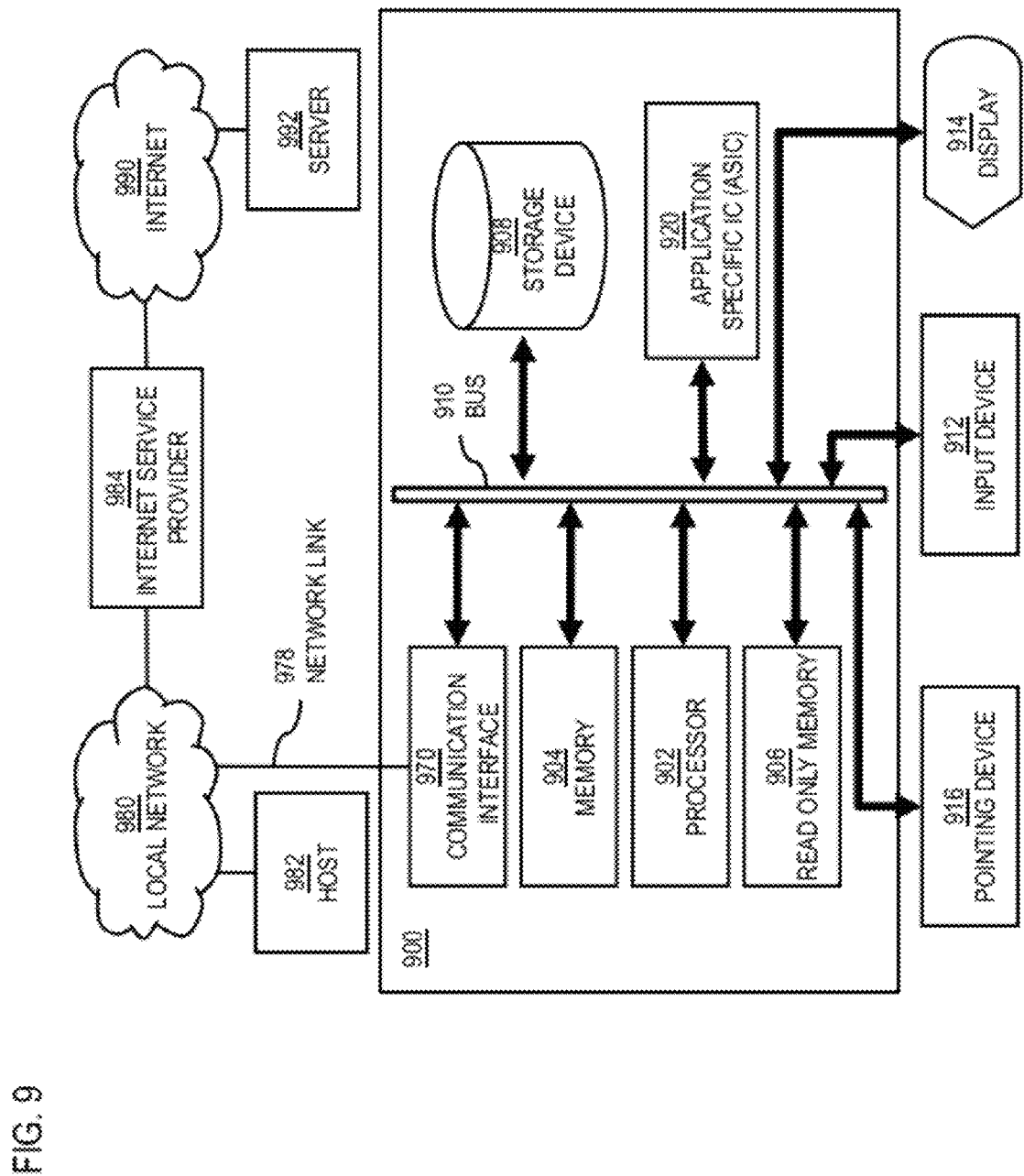
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to clean data sets for a search process as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of cleaning data sets for a search process.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to cleaning data sets for a search process. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or any other dynamic storage device, stores information including processor instructions for cleaning data sets for a search process. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or any other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for cleaning data sets for a search process, is provided to the bus 910 for use by the processor from an external input device 912, such as a keyboard containing alphanumeric keys operated by a human user, a microphone, an Infrared (IR) remote control, a joystick, a game pad, a stylus pen, a tough screen, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT), a liquid crystal display (LCD), a light emitting diode (LED) display, an organic LED (OLED) display, a plasma screen, or a printer for presenting text or images, and a pointing device 916, such as a mouse, a trackball, cursor direction keys, or a motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of ASICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for cleaning data sets for a search process to the UE 101.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Nontransitory media, such as non-volatile media, include, for example, optical or magnetic disks, such as storage device 908. Volatile media include, for example, dynamic memory 904. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or any other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to clean data sets for a search process as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of functions. Chip set or chip 1000, or a portion thereof, constitutes a means for performing one or more steps of cleaning data sets for a search process.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to clean data sets for a search process. The memory 1005 also stores the data associated with or generated by the execution of the inventive steps.

Figure 11:
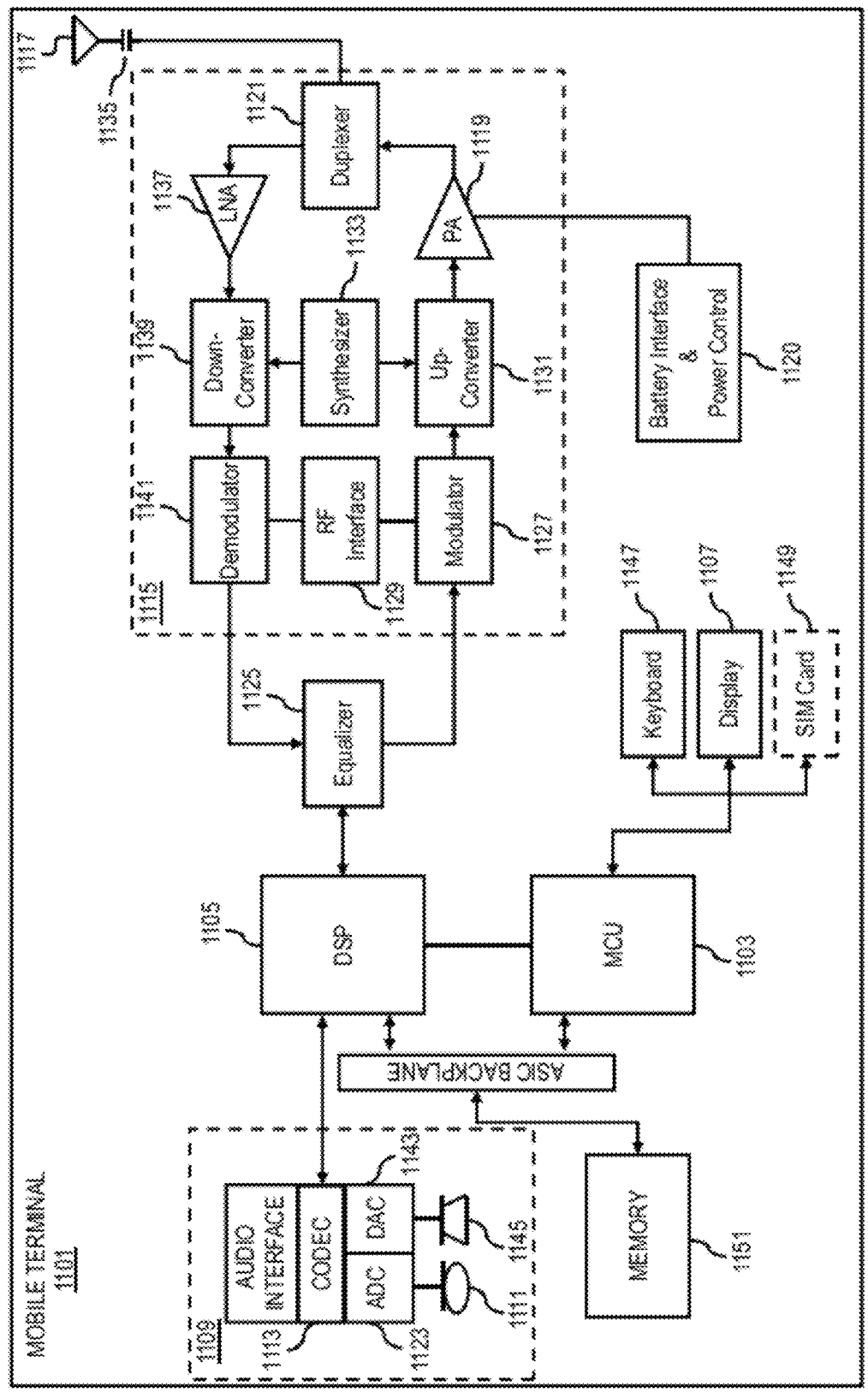
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1101, or a portion thereof, constitutes a means for performing one or more steps of cleaning data sets for a search process. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of cleaning data sets for a search process. The display 1107 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103 which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to clean data sets for a search process. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
    one or more reference documents associated with at least one region;
    a processing, by a processor, of the one or more reference documents to determine a frequency distribution of one or more candidate stop words with respect to the at least one region;
    a selection of one or more stop words applicable to the at least one region from the one or more candidate stop words based, at least in part, on one or more frequency distribution criteria; and
    a processing of at least one data set associated with a search process to generate at least one enhanced data set by filtering the one or more stop words from the at least one data set.

2. A method of claim 1, wherein the at least one data set include, at least in part, (a) at least one content data set over which the search process operates, (b) at least one search log data set for recording activity associated with one or more users of the search process, (c) at least one access log data set for recording access by the one or more users to the at least one content data set, or (d) a combination thereof.

3. A method of claim 1, wherein the (1) data and/or (2) information and/or (3) at least one signal are further based, at least in part, on the following:
    metadata associated with one or more users of the search process, wherein the metadata includes at least in part one or more search histories, context information, or a combination thereof; and
    a processing of the metadata to determine one or more alternative tokens to associate with one or more tokens of the at least one data set,
    wherein the at least one enhanced data set is further based, at least in part, on the association of the one or more alternative tokens with the one or more tokens.

4. A method of claim 1, wherein the (1) data and/or (2) information and/or (3) at least one signal are further based, at least in part, on the following:
    a processing of the at least one data set to determine one or more prefix tokens, one or more suffix tokens, or a combination thereof,
    wherein the at least one enhanced data set is further based, at least in part, on filtering the one or more prefix tokens, the one or more suffix tokens, or a combination thereof from the at least one data set.

5. A method of claim 1, wherein the (1) data and/or (2) information and/or (3) at least one signal are further based, at least in part, on the following:
    a processing of at least one data set to determine one or more synonymous tokens; and
    a normalization of the one or more synonymous tokens,
    wherein the at least one enhanced data set is further based, at least in part, on the normalization.

6. A method of claim 5, wherein the (1) data and/or (2) information and/or (3) at least one signal are further based, at least in part, on the following:
    respective context information associated with the one or more synonymous tokens;
    a processing of the respective context information to determine one or more duplicates among the one or more synonymous tokens,
    wherein the normalization comprises, at least in part, removal of the one or more duplicates.

7. A method of claim 5, wherein the (1) data and/or (2) information and/or (3) at least one signal are further based, at least in part, on the following:
    a processing of the at least one data set to determine one or more translations, one or more permutations, or a combination thereof of the one or more synonymous tokens,
    wherein the normalization is based, at least in part, on the one or more translation, the one or more permutations, or a combination thereof.

8. A method of claim 1, wherein the (1) data and/or (2) information and/or (3) at least one signal are further based, at least in part, on the following:
- a processing of the at least one data set to determine context information, one or more users, or a combination thereof associated with one or more tokens of the at least one data set; and
- at least one determination of a frequency distribution based, at least in part, on the context information, the one or more users, or a combination thereof,
- wherein the at least one enhanced data set is further based, at least in part, on filtering of the one or more tokens according to the frequency distribution.

9. A method of claim 1, wherein the (1) data and/or (2) information and/or (3) at least one signal are further based, at least in part, on the following:
- a processing of the at least one data set to determine one or more string tokens associated with at least one test model,
- wherein the at least one enhanced data set is further based, at least in part, on filtering of the one or more string tokens.

10. A method of claim 1, wherein the search process includes, at least in part, a location-based search process, a content search process, a service search process, or a combination thereof.

11. An apparatus comprising:
- at least one processor; and
- at least one memory including computer program code for one or more programs,
- the at least one memory and the computer program code configured to, with the at least one processor, cause the apparatus to perform at least the following,
  - determine one or more reference documents associated with at least one region;
  - process and/or facilitate a processing of the one or more reference documents to determine a frequency distribution of one or more candidate stop words with respect to the at least one region;
  - cause, at least in part, selection of one or more stop words applicable to the at least one region from the one or more candidate stop words based, at least in part, on one or more frequency distribution criteria; and
  - process and/or facilitate a processing of at least one data set associated with a search process to generate at least one enhanced data set by filtering the one or more stop words from the at least one data set.

12. An apparatus of claim 11, wherein the at least one data set include, at least in part, (a) at least one content data set over which the search process operates, (b) at least one search log data set for recording activity associated with one or more users of the search process, (c) at least one access log data set for recording access by the one or more users to the at least one content data set, or (d) a combination thereof.

13. An apparatus of claim 11, wherein the apparatus is further caused to:
- determine metadata associated with one or more users of the search process, wherein the metadata includes at least in part one or more search histories, context information, or a combination thereof; and
- process and/or facilitate a processing of the metadata to determine one or more alternative tokens to associate with one or more tokens of the at least one data set,
- wherein the at least one enhanced data set is further based, at least in part, on the association of the one or more alternative tokens with the one or more tokens.

14. An apparatus of claim 11, wherein the apparatus is further caused to:
- process and/or facilitate a processing of the at least one data set to determine one or more prefix tokens, one or more suffix tokens, or a combination thereof,
- wherein the at least one enhanced data set is further based, at least in part, on filtering the one or more prefix tokens, the one or more suffix tokens, or a combination thereof from the at least one data set.

15. An apparatus of claim 11, wherein the apparatus is further caused to:
- process and/or facilitate a processing of at least one data set to determine one or more synonymous tokens; and
- cause, at least in part, a normalization of the one or more synonymous tokens,
- wherein the at least one enhanced data set is further based, at least in part, on the normalization.

16. An apparatus of claim 15, wherein the apparatus is further caused to:
- determine respective context information associated with the one or more synonymous tokens;
- process and/or facilitate a processing of the respective context information to determine one or more duplicates among the one or more synonymous tokens,
- wherein the normalization comprises, at least in part, removal of the one or more duplicates.

17. An apparatus of claim 15, wherein the apparatus is further caused to:
- process and/or facilitate a processing of the at least one data set to determine one or more translations, one or more permutations, or a combination thereof of the one or more synonymous tokens,
- wherein the normalization is based, at least in part, on the one or more translation, the one or more permutations, or a combination thereof.

18. An apparatus of claim 11, wherein the apparatus is further caused to:
- process and/or facilitate a processing of the at least one data set to determine context information, one or more users, or a combination thereof associated with one or more tokens of the at least one data set; and
- determine a frequency distribution based, at least in part, on the context information, the one or more users, or a combination thereof,
- wherein the at least one enhanced data set is further based, at least in part, on filtering of the one or more tokens according to the frequency distribution.

19. An apparatus of claim 11, wherein the apparatus is further caused to:
- process and/or facilitate a processing of the at least one data set to determine one or more string tokens associated with at least one test model,
- wherein the at least one enhanced data set is further based, at least in part, on filtering of the one or more string tokens.

20. An apparatus of claim 11, wherein the search process includes, at least in part, a location-based search process, a content search process, a service search process, or a combination thereof.

* * * * *